(No Model.)
H. M. RHOADS.
COMBINED HAY RAKE AND LOADER.
No. 302,779. Patented July 29, 1884.
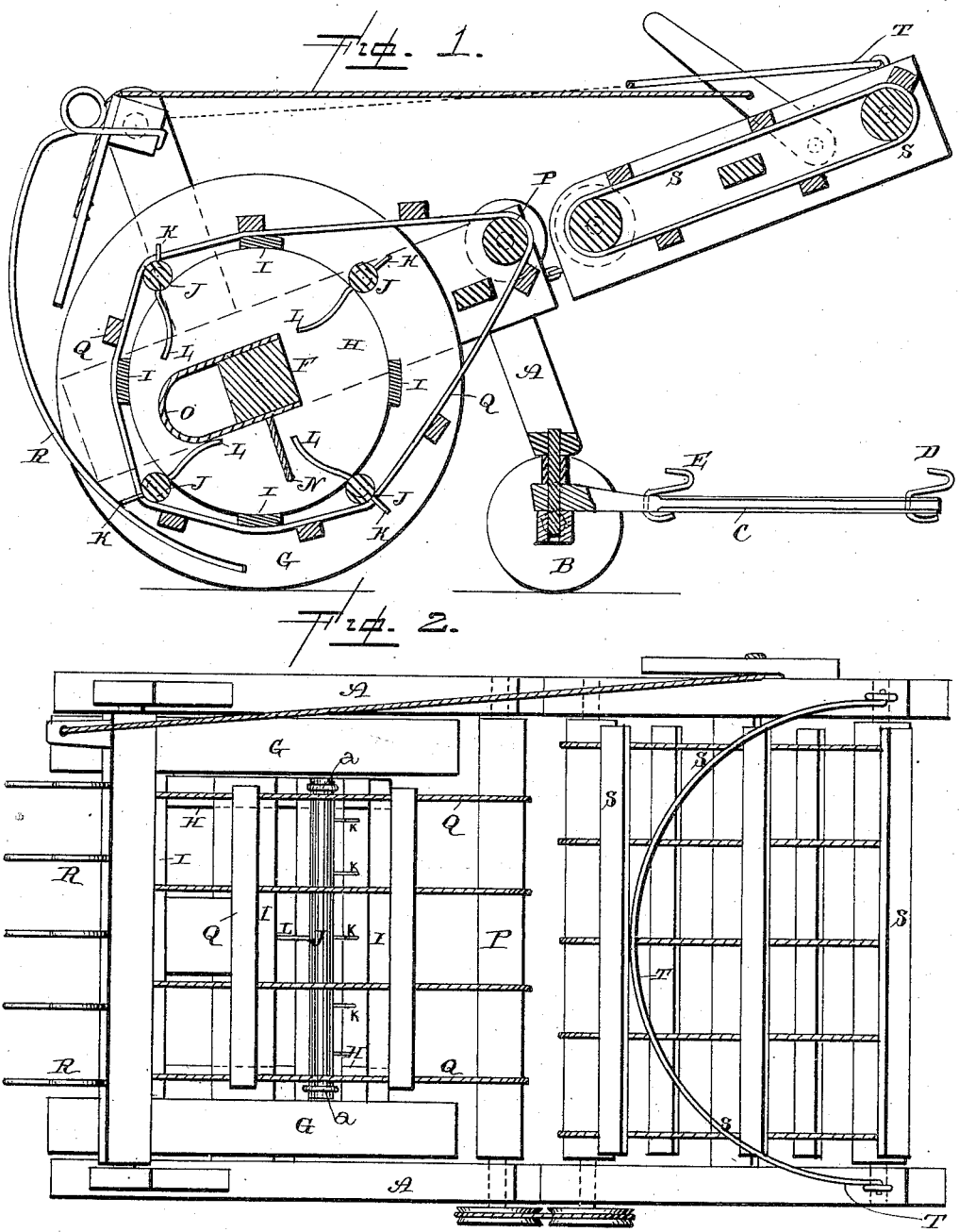

UNITED STATES PATENT OFFICE.

HORACE MEAD RHOADS, OF COWDEN, ILLINOIS.

COMBINED HAY RAKE AND LOADER.

SPECIFICATION forming part of Letters Patent No. 302,779, dated July 29, 1884.

Application filed September 18, 1883. (No model.)

*To all whom it may concern:*

Be it known that I, HORACE M. RHOADS, of Cowden, in the county of Shelby and State of Illinois, have invented certain new and useful Improvements in Hay Rakes and Loaders; and I do hereby declare the following to be a full, clear, and exact description of the invention, such as will enable others skilled in the art to which it pertains to make and use it, reference being had to the accompanying drawings, which form part of this specification.

My invention relates to an improvement in combined hay rakes and loaders; and it consists in the combination of the frame, a fixed axle provided with projections to operate the arms on the rake-shafts, driving-wheels, two disks which are rigidly secured together and fastened to one of the driving-wheels, so as to cause them to revolve with that wheel, rake-shafts carried by the disks and provided with arms, and the rake-teeth, as will be more fully described hereinafter.

The object of my invention is to provide a machine which can be either attached to the rear of the wagon or have a wagon attached to its side, and which, when driven along over the field, will rake the hay and then load it upon the wagon.

Figure 1 is a vertical longitudinal section of a machine embodying my invention. Fig. 2 is a plan view of the same.

A A represent a suitable frame, which is supported at its front by the wheels B, which wheels are secured to an axle that is made fast to the under side of the rear end of the tongue C. This tongue is provided with a hook, D, at its front end, and with a second similar hook, E, on its upper side near its rear end. When the tongue is hooked to the rear end of a wagon by means of the forward hook, D, the hay which is elevated and carried forward by the machine will be delivered into the wagon near the rear end thereof; but when the rearward hook, E, is secured to the wagon the machine will be brought nearer to and will project the elevator farther forward over the body of the wagon, and the hay will be delivered into it near its front end. In case it should be desired to deliver the hay over the side of the wagon, the horses will be harnessed directly to the tongue C of the machine, and a slightly-different construction of the carriers will be necessary. In this frame A is secured a stationary axle, F, upon which the two driving-wheels G are placed. To one of these driving-wheels, upon its inner side, is secured one of the disks H, which disks are rigidly secured together by means of the cross-bars I. In between these driving-wheels G and the disks H may be placed the usual ratchets, so as to let one or both of the driving-wheels turn backward, and thus assist in turning the machine. Also, swiveled upon these wheels H are a number of rake-shafts, J, which are provided both with the teeth K and the arms L. The shafts J are swiveled or pivoted upon the edges of the disks by means of suitable rings, bands, or straps, a, which are rigidly secured to the disks, and through which the ends of the shafts pass. When the wheels H are made to revolve with the driving-wheels G, these rake-shafts J are carried around and made to catch the hay, both from the ground and from the front of the rake-teeth R, and carry it upward. In order to prevent the rake-teeth K from turning backward, either when they come in contact with the hay that is lying upon the ground or that which has been gathered by the rake-teeth R, a suitable arm or projection, N, is secured to the under side of the axle, against which the arms L on the rake-shafts J strike. Also, secured to the rear edge of the axle is the projection O, against which the arms L are to strike as soon as they leave the projection N. As the rake-teeth K come in contact with the hay, they would give backward, were it not that the arms L strike against the projection N on the under side of the axle. The projection N and arm L then serve as braces to hold the shaft stiff in position as it is carried backward and around. As the rake-shaft J passes under the projection, the teeth K are given a gradual turning movement by reason of the friction from the arm L against the projection N, and then, when the arm L slips off from the projection, by reason of moving on past it, it at once strikes the projection O on the rear end of the axle, and continues to hold the teeth stiff in position, and continues to turn them upward until the top of the elevator is reached. Also, passed around the rake-shafts and the cross-bars I, which form, in connection with the disks, an operating-drum, and around the smaller shaft or drum P, which is journaled in the front of the frame, is an endless elevator or carrier, Q, which helps to carry the hay forward after the teeth K upon the rake-shafts have taken the hay from the large rake-teeth R, which follow immediately behind the machine and carry up the hay in the usual manner. Loosely attached to the front end of the frame A is a second endless carrier, S, and this carrier takes the hay from the first carrier and carries it on upward to deliver it upon the wagon. The rake-teeth R have a suitable lever secured to their head, which lever is connected by means of a cord, wire, or chain with a second lever, which is within easy reach of the driver. By moving this second lever upon the side of the upper elevator the driver can manage the rake at pleasure. Secured to the upper end of the upper elevator is a suitable bail, T, to which is connected a rope or chain by means of which the angle at which the upper elevator is placed can be regulated at will. The driver can readily regulate his team and the whole of the raking attachments above described with perfect ease, and thus a single man and team can rake the hay from the ground and deliver it upon the wagon.

Having thus described my invention, I claim—

In a combined hay rake and loader, the combination of the frame, a fixed axle provided with projections for operating the arms of the rake-shafts, the driving-wheels, the two disks which are rigidly secured together by means of cross-bars, and secured to one of the driving-wheels, so as to revolve with it, rake-shafts loosely secured to the edges of the disks and provided with arms to strike against the projections on the axle, and teeth to carry up the hay, the rake-teeth R, and an endless elevating-belt, substantially as shown.

In testimony whereof I affix my signature in presence of two witnesses.

HORACE MEAD RHOADS.

Witnesses:
M. POLLARD,
THOMAS D. MOORE.